US010848825B2

(12) United States Patent
Fung (10) Patent No.: US 10,848,825 B2
(45) Date of Patent: Nov. 24, 2020

(54) PROVIDING DIGITAL VIDEO ASSETS WITH MULTIPLE AGE RATING LEVELS (71) Applicant: Western Digital Technologies, Inc., San Jose, CA (US)

(72) Inventor: Daniel Hing-Fai Fung, Tustin, CA (US)

(73) Assignee: Western Digital Technologies, Inc., San Jose, CA (US)

(*) Notice: Subject to any disclaimer, the term of this patent is extended or adjusted under 35 U.S.C. 154(b) by 0 days.

(21) Appl. No.: 16/115,462

(22) Filed: Aug. 28, 2018

(65) Prior Publication Data
US 2019/0007738 A1 Jan. 3, 2019

Related U.S. Application Data (63) Continuation of application No. 14/582,067, filed on Dec. 23, 2014, now Pat. No. 10,063,925.

(51) Int. Cl.
H04N 21/454 (2011.01)
H04N 21/854 (2011.01)
H04N 21/258 (2011.01)
H04N 21/475 (2011.01)

(52) U.S. Cl.
CPC ..... H04N 21/454 (2013.01); H04N 21/25825 (2013.01); H04N 21/25833 (2013.01); H04N 21/4751 (2013.01); H04N 21/854 (2013.01)

(58) Field of Classification Search
CPC ....... H04N 21/25825; H04N 21/25833; H04N 21/454; H04N 21/4751; H04N 21/854
See application file for complete search history.

(56) References Cited

U.S. PATENT DOCUMENTS

| 6,115,057 A * | 9/2000 | Kwoh ..... H04H 60/48 348/460 |
| 8,079,044 B1 * | 12/2011 | Craner ..... H04N 21/4532 725/28 |
| 8,850,469 B1 * | 9/2014 | Yang ..... H04N 21/25841 725/135 |
| 2003/0074663 A1 * | 4/2003 | Pan ..... H04N 5/44543 725/39 |
| 2003/0122966 A1 * | 7/2003 | Markman ..... G11B 27/105 348/563 |
| 2009/0133051 A1 * | 5/2009 | Hildreth ..... H04N 5/4403 725/28 |
| 2010/0011392 A1 * | 1/2010 | Bronstein ..... G06K 9/00758 725/28 |
| 2010/0273553 A1 * | 10/2010 | Zalewski ..... H04N 21/235 463/31 |

* cited by examiner

Primary Examiner — Nicholas T Corbo
(74) Attorney, Agent, or Firm — Chang & Hale LLP (57) ABSTRACT Systems and methods are disclosed for providing digital video assets with multiple age rating levels. A computing device may be configured to generate a digital video asset that includes a plurality of segments. Each segment of the plurality of segments may include a portion of the digital video asset. The digital video asset may not include duplicate segments. Each segment of the plurality of segments may be associated with one of a plurality of age rating levels. The computing device may also be configured to identify sets of segments. Each set of segments may be associated with one of the plurality of age rating levels. The computing device may be further configured to generate first data indicative of the sets of segments.

20 Claims, 9 Drawing Sheets

FIG. 2A

SCRIPT 200

| Segment Name | 1-PG | 2-PG | 3-G | 4-PG | 5-PG | 6-PG | 7-PG | 7-PG13 | 8-PG | 9-PG | 10-PG | 10-PG13 | 10-R | 11-PG | 12-PG13 | 12-R | 13-G | 19-PG | 14-PG | 15-PG | 16-PG | 17-PG | 18-PG |
|---|---|---|---|---|---|---|---|---|---|---|---|---|---|---|---|---|---|---|---|---|---|---|---|
| Segment Number | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |

FIG. 2B

SCRIPT 210

| Segment Name | 1-PG | 2-PG | 3-G | 4-PG | 5-PG | 6-PG | 7-PG | 8-PG | 9-PG | 10-PG | 11-PG | 13-G | 19-PG | 14-PG | 15-PG | 16-PG | 17-PG | 18-PG |
|---|---|---|---|---|---|---|---|---|---|---|---|---|---|---|---|---|---|---|
| Segment Number | 1 | 2 | 3 | 4 | 5 | 6 | 7 | 8 | 9 | 10 | 11 | 17 | 18 | 19 | 20 | 21 | 22 | 23 |

SCRIPT 220

| Segment Name | 1-PG | 2-PG | 3-G | 4-PG | 5-PG | 6-PG | 7-PG13 | 8-PG | 9-PG | 10-PG13 | 11-PG | 12-PG13 | 13-G | 14-PG | 15-PG | 16-PG | 17-PG | 18-PG |
|---|---|---|---|---|---|---|---|---|---|---|---|---|---|---|---|---|---|---|
| Segment Number | 1 | 2 | 3 | 4 | 5 | 6 | 8 | 9 | 10 | 12 | 14 | 15 | 17 | 19 | 20 | 21 | 22 | 23 |

*FIG. 2C*

SCRIPT 230

| Segment Name | 1-PG | 2-PG | 3-G | 4-PG | 5-PG | 6-PG | 7-PG13 | 8-PG | 9-PG | 10-R | 11-PG | 12-R | 13-G | 14-PG | 15-PG | 16-PG | 17-PG | 18-PG |
|---|---|---|---|---|---|---|---|---|---|---|---|---|---|---|---|---|---|---|
| Segment Number | 1 | 2 | 3 | 4 | 5 | 6 | 8 | 9 | 10 | 13 | 14 | 16 | 17 | 19 | 20 | 21 | 22 | 23 |

*FIG. 2D*

TABLE 300

| Rating Level | Script |
|---|---|
| G | N/A |
| PG | Script 210 |
| PG13 | Script 220 |
| R | Script 230 |
| NC17 | Script 230 |

PROVIDING DIGITAL VIDEO ASSETS WITH MULTIPLE AGE RATING LEVELS

CROSS-REFERENCE TO RELATED APPLICATIONS

This application is a continuation of U.S. application Ser. No. 14/582,067 filed Dec. 23, 2014 and entitled "Providing Digital Video Assets with Multiple Age Rating Levels," which is incorporated by reference herein in its entirety for all purposes.

BACKGROUND

Digital video assets are widely available to users in various formats (e.g., streaming formats, disc formats, etc.). Examples of digital video assets may include movies, sports videos, newscasts, music videos, concert videos, various types of TV programs, online videos, streaming videos, etc. A digital video asset may be given an age rating level (e.g., may be associated with a parental age rating) by an agency or organization. The age rating level of the digital video asset may indicate whether the digital video asset may be considered appropriate for people of different ages (e.g., based on the amount of violence, nudity, foul language, and/or adult content) by the agency or organization.

BRIEF DESCRIPTION OF THE DRAWINGS

Various embodiments are depicted in the accompanying drawings for illustrative purposes, and should in no way be interpreted as limiting the scope of this disclosure. In addition, various features of different disclosed embodiments can be combined to form additional embodiments, which are part of this disclosure.

DETAILED DESCRIPTION

While certain embodiments are described, these embodiments are presented by way of example only, and are not intended to limit the scope of protection. Indeed, the novel methods and systems described herein may be embodied in a variety of other forms. Furthermore, various omissions, substitutions, and changes in the form of the methods and systems described herein may be made without departing from the scope of protection.

Overview

As discussed above, a digital video asset may be given an age rating level (by an agency or organization) that may indicate whether the digital video asset is considered appropriate for people of different ages. For example, television shows (e.g., sitcoms, reality shows, movies, etc.) may be given one of the following ratings: 1) TV-Y (e.g., appropriate for all children); 2) TV-Y7 (e.g., appropriate for all children age 7 and above); 3) TV-G (e.g., appropriate for all ages); 4) TV-PG (e.g., may be unsuitable for younger children); 5) TV-14 (e.g., may be unsuitable for children under 14 years of age); 6) TV-MA (e.g., may be unsuitable for children under 17 years of age). In another example, movies (e.g., theatre movies) may be given one of the following ratings: 1) G (e.g., appropriate for all ages); 2) PG (e.g., may be unsuitable for younger children); 3) PG13 (e.g., may be unsuitable for children under 13 years of age); 4) R (e.g., may be unsuitable for children under 17 years of age); 5) NC17 (e.g., unsuitable for children under 17 years of age). It shall be understood that the age rating levels above are merely examples of age rating levels. Different geographic regions (e.g., different countries, provinces, states, cities, etc.) may have different age rating levels and/or a different number of age rating levels.

Generally, an age rating level applies to a digital video asset as a whole. For example, if a movie is given the age rating level of PG-13, then the whole move is considered PG-13. In addition, if a producer wants to provide multiple versions (with different age rating levels) of a digital video asset, the producer may provide multiple copies of the digital video asset. For example, the producer may release multiple discs (e.g., digital video discs (DVDs)) and each disc may include one of the multiple versions. This may increase the cost to release and/or distribute the digital video asset. As a result, producers may find it less desirable to distribute multiple versions of a digital video asset.

Certain embodiments disclosed herein provide systems and/or methods of generating and/or providing a digital video asset with multiple versions. Each of the multiple versions may have a different age rating level. This may allow a producer/owner of the digital video asset to provide the digital video asset to a wider or larger audience (e.g., more groups of people). The digital video asset may use differential storage to reduce the amount of storage space used (to store the digital video asset) and/or to reduce the cost to provide the multiple versions of the digital video asset to users/viewers.

Digital Video Assets

Figure 1A:
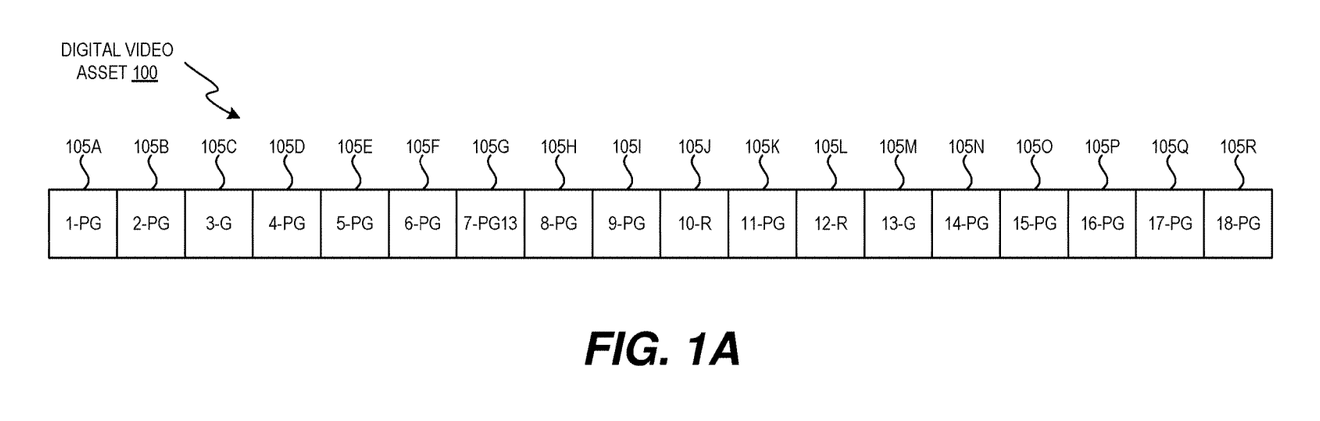
FIG. 1A is a diagram of a digital video asset, according to an embodiment.

FIG. 1A is a diagram of a digital video asset 100, according to an embodiment. As discussed above, a digital video asset 100 may be a movie, a sports video (e.g., a video of a sports cam), a newscast, a music video, a concert video (e.g., a video of a musical performance or concert), a television program, an online video, a streaming video, etc. As illustrated in FIG. 1A, the digital video asset 100 may be divided into segments 105A through 105R. A segment of the digital video asset 100 may be a portion of the digital video asset. Each segment may include one or more scenes of the digital video asset 100. Each of the segments 105A through 105R and 155A through 155E may have different sizes and/or lengths. A scene may refer to a set of frames combined based on one or more criteria (e.g., a common place, common actors, a consecutive occurrence over a time period, etc.). A scene may also depict events and/or actions in a location. A scene may also refer to an association of time, place (e.g., location), and/or characters (e.g., actors, people, and/or subjects) depicted in the digital video asset 100. Various examples of types of scenes include, but are not limited to, love scenes, dream scenes, action scenes, chase scenes, flashback scenes, fighting scenes, crash scenes, opening scenes, closing scenes, etc.

As illustrated in FIG. 1A, each of the segments 105A through 105R may be associated with an age rating level from a plurality (e.g., a set) of age rating levels. For example, the segment 105A is associated with the rating "PG," segment 105B is associated with the rating "PG," segment 105C is associated with the rating "G," etc. Generally, the digital video asset 100 as a whole may be given (e.g., may be associated with) the highest rating level (e.g., the strictest rating level or the rating level that limits the number of possible viewers the most) that is associated with the segments in the digital video asset 100. For example, as illustrated in FIG. 1A, the highest age rating level of any of the segments 105A through 105R in the digital video asset 100 is "R" and the digital video asset 100 may be associated with the age rating level "R" as a whole.

In one embodiment, each segment of the digital video asset 100 may associated with an identifier (e.g., a name, a value, text, a string, etc.). The identifier may indicate the playback order (e.g., a temporal order) of the segment within the digital video asset 100. The playback order may be the order in which different segments may be played and/or viewed by a user/media player. The identifier may also indicate the age rating level associated with the segment. For example, segment 105A is associated with the identifier "1-PG" which may indicate the playback order of the segment (e.g., first) and the age rating level of the segment (e.g., PG). In another example, segment 105G is associated with the identifier "7-PG13" which may indicate the playback order of the segment (e.g., seventh) and the age rating level of the segment (e.g., PG-13).

Figure 1B:
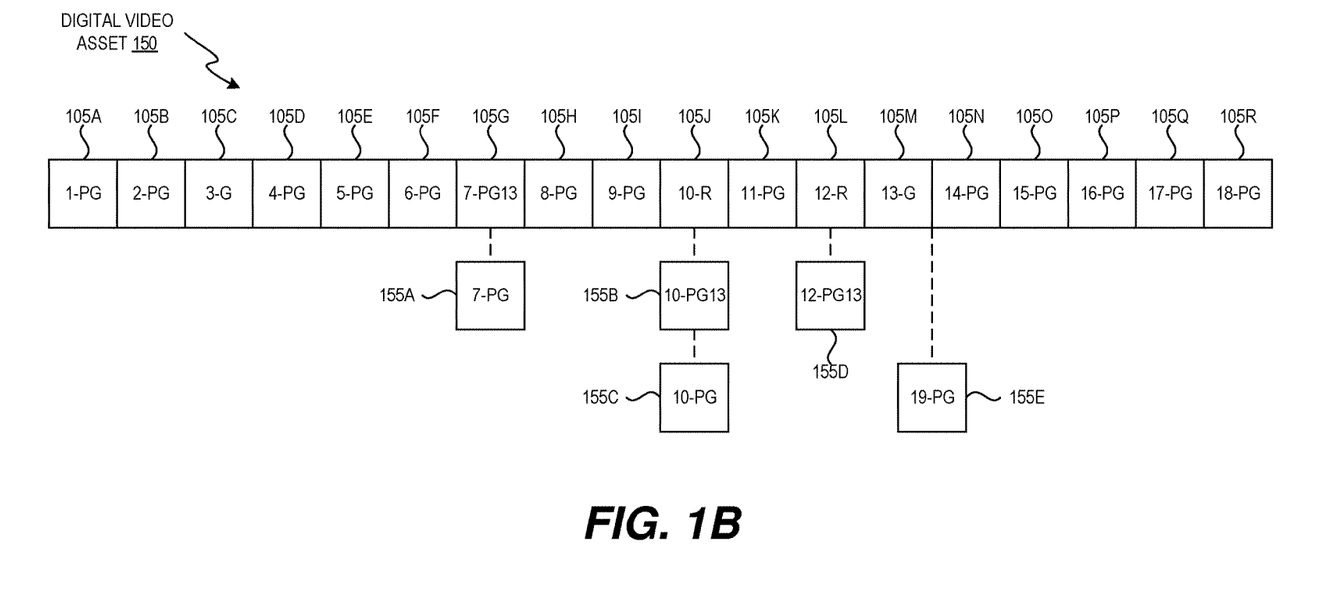
FIG. 1B is a diagram of a digital video asset, according to an embodiment.

FIG. 1B is a diagram of a digital video asset 150, according to an embodiment. As illustrated in FIG. 1B, the digital video asset 150 may be divided into segments 105A through 105R. Each segment may include one or more scenes (e.g., a set of frames combined based on one or more criteria). Each segment may be associated with an age rating level from a plurality of age rating levels (e.g., G, PG, PG13, R, NC17, etc.). In one embodiment, each segment of the digital video asset 150 may associated with an identifier. The identifier may indicate the playback order of the segment within the digital video asset 150. The identifier may also indicate the age rating level associated with the segment.

As discussed above, generally, the digital video asset 150 may be associated with the highest rating level that is associated with the segments. For example, referring back to FIG. 1A, the highest age rating level of any of the segments 105A through 105R in the digital video asset 100 is "R" and the digital video asset 100 may be associated with the age rating level "R" as a whole. Thus, a producer and/or distributor of the digital video asset 150 may not be able to provide the digital video asset 150 to as wide of an audience as desired. For example, the audience for a digital video asset that has an age rating level of PG may be larger than the audience for a digital video asset that has an age rating level of R.

The digital video asset 150 also includes segments 155A through 155E. In one embodiment, segments 155A through 155D may be different versions of other segments in the digital video asset 150. For example, segment 155C may be a different version of the segment 105J in the digital video asset 150. As illustrated in FIG. 1A, segment 105J is associated with the age rating level "R." Segment 155C may be an edited version of the segment 105J and may have less violence, foul language, nudity, references to drug use, etc., than segment 105J. Thus, segment 155C may have an age rating level of "PG." In another embodiment, segment 155E may be a new segment. For example, the producer may not create a "PG" version of the segment 105L. Instead, the producer may create the segment 155E (e.g., a new segment) which may explain events and/or actions that occurred in the segment 105L. For example, the segment 155E may be a flashback scene. The segment 155E may be played between segments 105M and 105N (e.g., after segment 105M and before segment 105N). In one embodiment, the segment 155E may include one or more scenes that may not have been in the original version of the digital video asset 150 (e.g., may not be in digital video asset 100). For example, a producer may create one or more new scenes (e.g., shoot one or more new scenes) and may include the one or more new scenes in the segment 155E.

In one embodiment, the segments 155A through 155E allow an owner, producer, distributor, etc., of the digital video asset 150 to provide multiple versions of the digital video asset 150 to users and/or viewers. For example, a user/viewer may want a version of the digital video asset 150 with an age level rating of "PG13" or with an age level rating of "PG," instead of an age level rating of "R." The segments 155A through 155E may different sets of segments to be created and/or identified. These different sets of segments may be different versions of the digital video asset 150 with different age level ratings (as discussed in more detail below).

In another embodiment, the digital video asset 150 may use differential storage to reduce the amount of storage space used and/or the cost to provide multiple versions of the digital video asset 150 to users/viewers. For example, the digital video asset 150 may lack duplicate segments. Rather than storing a first copy of a first version of the digital video asset 150 (with a first age level rating) and storing a second copy of the digital video asset 150 (with a second age level rating), the segments 155A through 155E allow the producer/distributor to store the segments that may differ between the different versions of the digital video asset 150 and store one copy of the segments that do not differ between the different versions of the digital video asset. For example, a PG version of the digital video asset 150 may include segment 105B and an R version of the digital video asset 150 may also include segment 105B. A producer/distributor may store only one copy of the segment 105B on a storage medium (e.g. a hard disk, flash memory, a digital video disc (DVD), a Blu-ray disc (BD), etc.).

As discussed above, if a producer/distributor previously wished to provide multiple versions of a digital video asset, the producer/distributor generally provided multiple complete copies of the digital video asset. The digital video asset 150 may allow a producer/distributor to store one copy of the segments that are common to multiple versions and store the segments that are different between the multiple versions. This may help reduce the amount of storage space used to store the digital video asset, may reduce network traffic/congestion, and may help reduce the cost to distribute/sell the digital video asset.

Figure 2A:
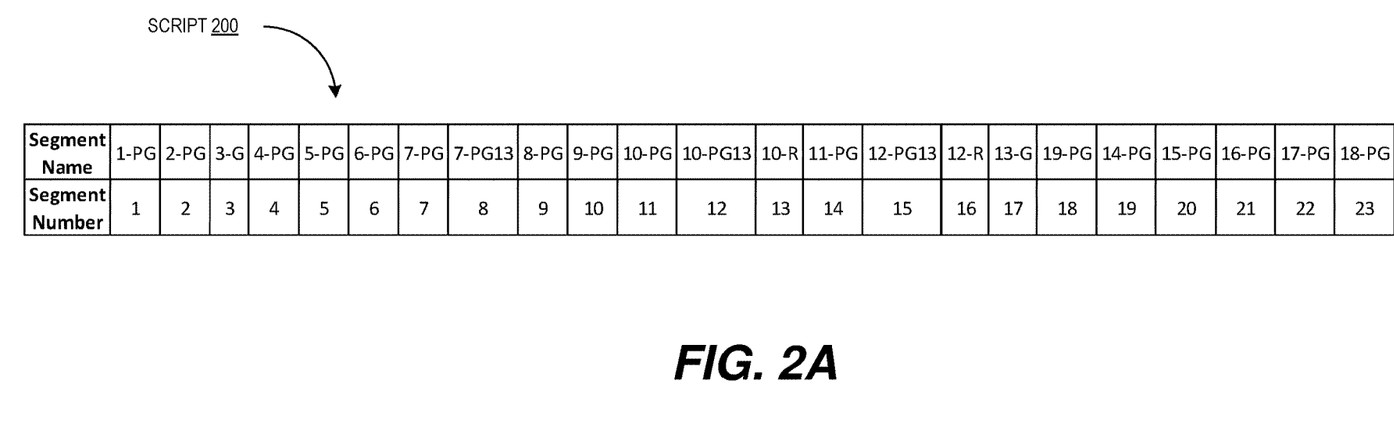
FIG. 2A is a diagram illustrating a script, according to an embodiment.

FIG. 2A is a diagram illustrating a script 200, according to an embodiment. Referring back to FIG. 1B, the script 200 includes identifiers for the segments 105A through 105R and 155A through 155E of the digital video asset 150. The script 200 also includes a segment number for each of the segments 105A through 105R and 155A through 155E. The segment number indicates an order for the segments 105A through 105R and 155A through 155E. For example, segment 105A (with the identifier "1-PG") has the segment number "1" indicating that that segment 105A is the first segment in the script 200. In another example, segment 155E has the segment number "18" indicating that segment 155E is the eighteenth segment in the script 200.

In one embodiment, the script 200 may be used to identify segments that are included in a script. Referring back to FIG. 1B, different scripts may be used to play the different versions of the digital video asset 150 (as discussed in more detail below). The scripts may include segment numbers and/or identifiers for the different sets of segments in each of the versions and the script 200 may be used to determine which segments are included in and/or referenced by the different scripts (e.g., scripts 210, 220, and/or 230 illustrated in FIGS. 2B through 2D).

In one embodiment, the script 200 may also indicate the order in which the segments 105A through 105R and 155A through 155E are stored on a storage medium (e.g. a hard disk, flash memory, DVD, BD, etc.). For example, a DVD/BD may store (e.g., write) data using a spiral pattern, starting from the inside of the DVD/BD and spiraling towards the outside of the DVD/BD). The segment numbers in the script 200 may indicate the order in which the segments 105A through 105R and 155A through 155E should be stored using the spiral pattern. Segment number 1 (e.g., segment 105A with the identifier "1-PG") may be stored at the beginning of the spiral pattern, segment number 2 (e.g., segment 105B with the identifier "2-PG") may be stored after segment number 1, etc.

Figure 2B:
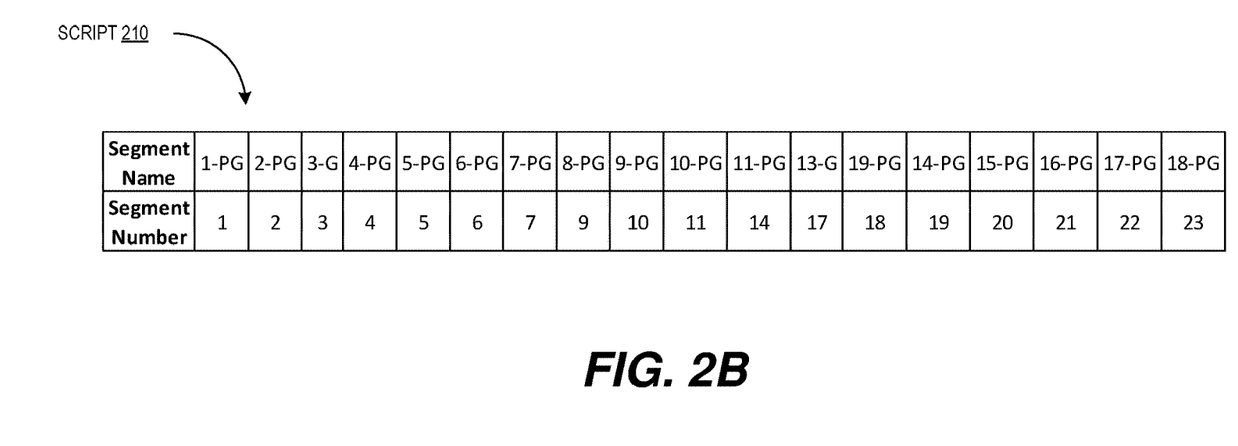
FIG. 2B is a diagram illustrating a script, according to an embodiment.

FIG. 2B is a diagram illustrating a script 210, according to an embodiment. A script may be a list, table, and/or other data that identifies a set of segments and/or a playback order (e.g., a temporal order) for the segments in the set of segments. Referring back to FIG. 1B, the script 210 includes identifiers for a set (e.g., a subset) of the segments 105A through 105R and 155A through 155E of the digital video asset 150. As discussed above, the segments 105A through 105R and 155A through 155E allow a producer/distributor to provide different versions of the digital video asset 150 with different age level ratings. The set of segments included in the script 210 may be a version of the digital video asset 150 with an age rating level of "PG." For example, each of the segments in the set of segments included in the script 210 has an age rating level of "PG" or lower (e.g., "G"). Thus, the version of the digital video asset 150 as a whole may have an age rating level of "PG."

The script 210 also includes a segment number for the set of segments. In one embodiment, the segment number may be used to determine a playback order for the set of segments. For example, the set of segments in the script 210 may be played or provided to a client device using a low to high order of segment numbers. In another embodiment, the playback order of the segments may be determined by the position of the segment within the script 210. For example, segment 105A (with the identifier "1-PG") is listed first in the script 210 so segment 105A may be the first segment played or provided to a client device. In another example, the segment 105H (with the identifier "8-PG") is listed eighth in script 210 and may be the eight segment to be played or provided to a client device.

In one embodiment, the script 210 may include the segment identifiers and may not include the segment numbers. For example, the script 210 may include segment identifiers and the order of the segment identifiers in the script 210 may indicate the playback order of the segments in the script 210. In one embodiment, the script 210 may include the segment numbers and may not include the segment identifiers. For example, the script 210 may include segment numbers and the script 200 may be used to determine which segments are included in the script 210 (e.g., the script 200 may be used to look up the segment identifiers).

Figure 2C:
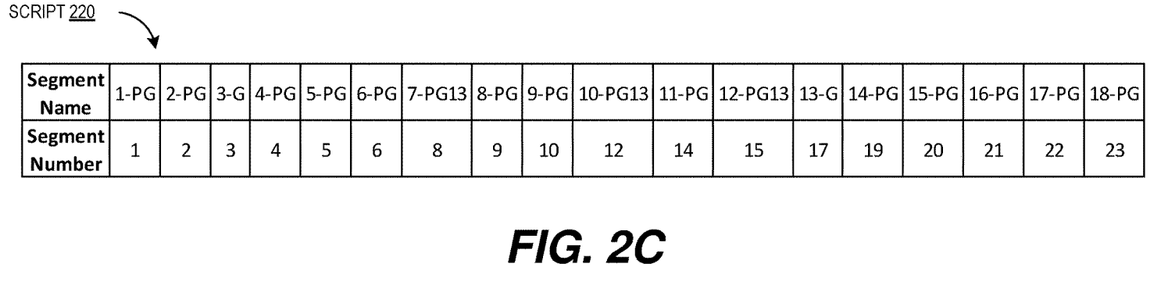
FIG. 2C is a diagram illustrating a script, according to an embodiment.

FIG. 2C is a diagram illustrating a script 220, according to an embodiment. A script may be a list, table, and/or other data that identifies a set of segments and/or a playback order (e.g., a temporal order) for the segments in the set of segments. Referring back to FIG. 1B, the script 220 includes identifiers for a set (e.g., a subset) of the segments 105A through 105R and 155A through 155E of the digital video asset 150. As discussed above, the segments 105A through 105R and 155A through 155E allow a producer/distributor to provide different versions of the digital video asset 150 with different age level ratings. The set of segments included in the script 220 may be a version of the digital video asset 150 with an age rating level of "PG-13." For example, each of the segments in the set of segments included in the script 220 has an age rating level of "PG-13" or lower (e.g., "PG" or "G"). Thus, the version of the digital video asset 150 as a whole may have an age rating level of "PG-13."

The script 220 also includes a segment number for the set of segments. In one embodiment, the segment number may be used to determine a playback order for the set of segments (as discussed above). In another embodiment, the playback order of the segments may be determined by the position of the segment within the script 220 (as discussed above). In one embodiment, the script 220 may include the segment identifiers and may not include the segment numbers (as discussed above). In one embodiment, the script 220 may include the segment numbers and may not include the segment identifiers (as discussed above).

Figure 2D:
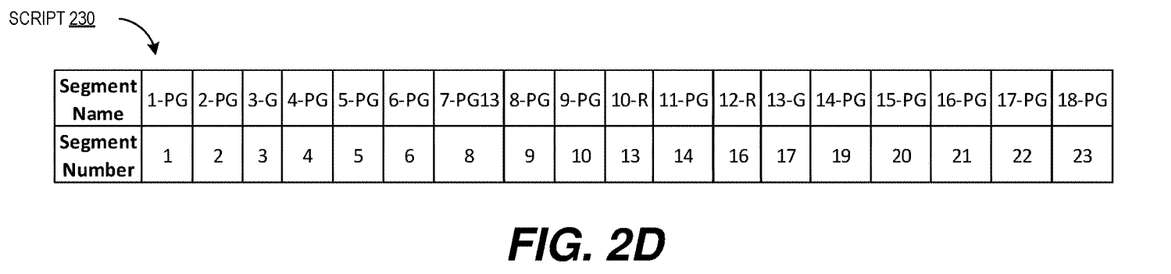
FIG. 2D is a diagram illustrating a script, according to an embodiment.

FIG. 2D is a diagram illustrating a script, according to an embodiment. A script may be a list, table, and/or other data that identifies a set of segments and/or a playback order (e.g., a temporal order) for the segments in the set of segments. Referring back to FIG. 1B, the script 230 includes identifiers for a set (e.g., a subset) of the segments 105A through 105R and 155A through 155E of the digital video asset 150. As discussed above, the segments 105A through 105R and 155A through 155E allow a producer/distributor to provide different versions of the digital video asset 150 with different age level ratings. The set of segments included in the script 230 may be a version of the digital video asset 150 with an age rating level of "R." For example, each of the segments in the set of segments included in the script 230 has an age rating level of "R" or lower (e.g., "PG-13," "PG," or "G"). Thus, the version of the digital video asset 150 as a whole may have an age rating level of "R."

The script 230 also includes a segment number for the set of segments. In one embodiment, the segment number may be used to determine a playback order for the set of segments (as discussed above). In another embodiment, the playback order of the segments may be determined by the position of the segment within the script 230 (as discussed above). In one embodiment, the script 230 may include the segment identifiers and may not include the segment numbers (as discussed above). In one embodiment, the script 230 may include the segment numbers and may not include the segment identifiers (as discussed above).

Figure 3:
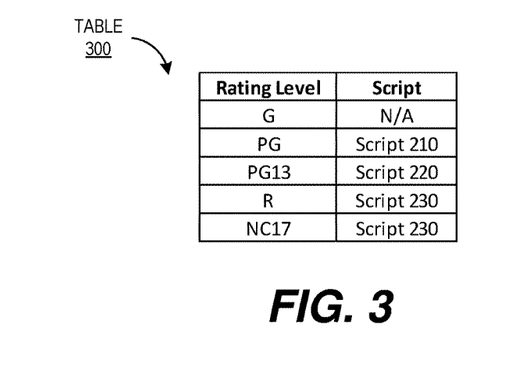
FIG. 3 is a diagram illustrating a table, according to an embodiment.

FIG. 3 is a diagram illustrating a table 300, according to an embodiment. As discussed above, a digital video asset may include multiple segments. A producer/distributor may provide multiple versions of a digital video asset and each version may be associated with an age rating level (from a plurality of age rating levels). Each version of the digital video asset may include a different set (e.g., a different subset) of segments. Scripts (e.g., scripts 200, 210, 220, and/or 230 illustrated in FIGS. 2A, 2B, 2C, and 2D) may indicate and/or identify the segments that are in each set of segments. Scripts may also be used to play and/or provide the different versions of the digital video asset to a client device.

In one embodiment, the table 300 may indicate which scripts should be used to play different versions of a digital video asset based on different age rating levels. For example, a user may provide input indicating a desired age rating level. Referring back to FIGS. 2A through 2D, the table 300 may indicate that the script 210 (illustrated in FIG. 2B) should be used to play and/or provide the "PG" version of the digital video asset 150 if the desired age rating level is "PG." The table 300 may also indicate that the script 220 (illustrated in FIG. 2C) should be used to play and/or provide the "PG13" version of the digital video asset 150 if the desired age rating level is "PG13." The table 300 may further indicate that the script 230 (illustrated in FIG. 2D) should be used to play and/or provide the "R" version of the digital video asset 150 if the desired age rating level is "R." The table 300 may also indicate that the script 230 should be used if the desired age rating level is "NC17." The table 300 may indicate that the highest age rating level for a version of the digital video asset may be "R" and that the script 230 may be used if the desired age rating level is "NC17". The table 300 further indicates that no script may be used if the desired age rating level is "G" (e.g., there is no "G" version of the digital video asset 150). A media player device and/or a media player application (illustrated in FIGS. 4A and 4B) may display an error message for the digital video asset 150 when the desired age rating level is "G." For example, the media player device and/or media player application may display an error message indicating that there is no version of the digital video asset 150 with an age level rating of "G".

Referring to FIGS. 1A through 3, the producer may provide the table 300, the scripts 200, 210, 220, and 230, and the digital video asset 150 to a distributor/manufacturer (e.g., a DVD manufacturer) and/or a content platform (e.g., a media server, a content distribution network, etc.). The distributor/manufacturer may use the table 300, the scripts 200, 210, 220, and 230, and the digital video asset 150 to manufacture or create storage mediums (e.g., BDs, DVDs, hard disks, etc.) that include the digital video asset 150 (as discussed below). The content platform may use the table 300, the scripts 200, 210, 220, and 230, and the digital video asset 150 to provide the digital video asset 150 to client devices (e.g., to allow client devices to stream and/or download one or more versions of the digital video asset 150).

In one embodiment, the producer may update one or more of the digital video asset 150, the table 300, and the scripts 200, 210, 220, and 230. For example, the producer may create a new version of the digital video asset 150 (e.g., a "G" version) and may create new segments for the new version. A new script may be created for the new version and the table 300 may be updated to include the new script. Updates to the digital video asset 150 may include updates to segments of the digital video asset 150, updates to the table 300, updates to the scripts 200, 210, 220, and 230, and updates to age rating levels of the segments and the versions of the digital video asset. Distributors, manufacturers, and/or users/viewers may download the updates via a network (e.g., the internet) or receive updates in storage medium (BD, DVD, Flash drives, SSD, HDD, etc.).

Playing and/or Providing Digital Video Assets to Client Devices

Figure 4A:
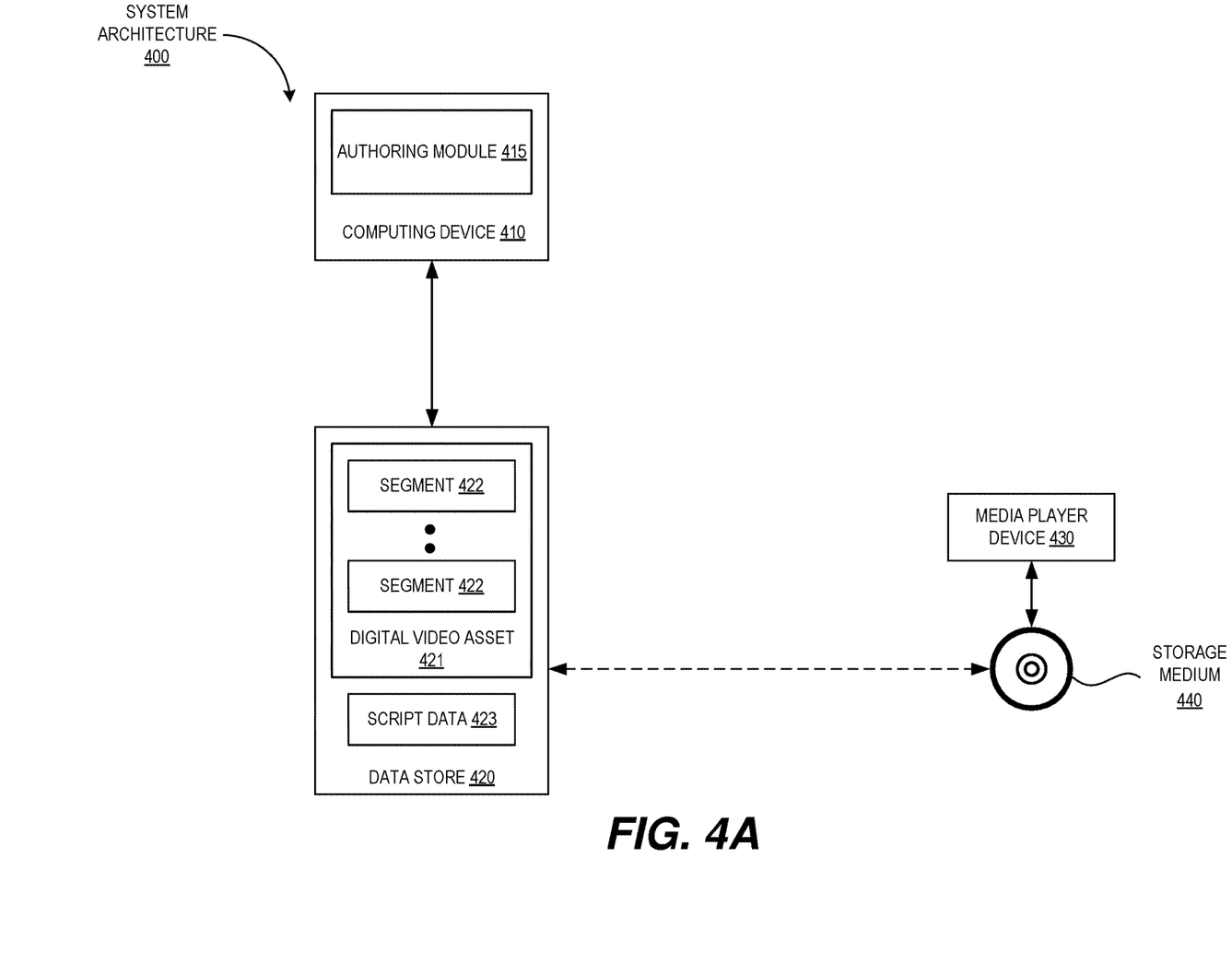
FIG. 4A is a diagram of a system architecture, according to an embodiment.

FIG. 4A is a diagram of a system architecture 400 according to one or more embodiments. The system architecture 400 includes a computing device 410, a data store 420, and a media player device 430. Examples of the computing device 410 may include, but are not are not limited to, a rack-mount server, a router computer, a server computer, a personal computer, a mainframe computer, a smartphone, a personal digital assistant (PDA), a laptop computer, a tablet computer, a desktop computer, etc. The data store 420 may be may be a memory (e.g., random access memory), a cache, a drive (e.g., a hard drive), a flash drive, a database system, or another type of component or device capable of storing data. The data store 420 may also include multiple storage components (e.g., multiple drives or multiple databases) that may also span multiple computing devices (e.g., multiple server computers). The data store 420 may be communicatively coupled to the computing device 410.

The computing device 410 includes an authoring module 415. In one embodiment, the authoring module 415 may be used to generate (e.g., create) and/or edit (e.g., modify) a digital video asset 421. The authoring module 415 may include a video editing component/module that allows a user to create, modify, add, and/or delete segments (e.g., portions) of the digital video asset 421. For example, the authoring module 415 may be used to generate a plurality of segments 422 for the digital video asset 421. Each of the segments 422 may include a portion of the digital video asset 421. Each of the segments 422 may be associated with one or a plurality of age level ratings (e.g., "G," "PG," "PG13," "R," etc.). In one embodiment, the authoring module may receive user input from a user (e.g., from a director, an editor, etc.) indicating the age level rating associated with each segment 422 (e.g., a user may enter the age rating level for each segment 422). As discussed above, digital video asset 421 may not include duplicate segments (e.g., the digital video asset 421 may not include segments that are exact copies of each other). For example, referring back to FIG. 1B, segment 155A and 105G may be different versions of the same portion of the digital video asset 421. Although segment 155A may be a different version of segment 105G (e.g., a version with less profanity, violence, etc.), the segment 155A may not be a duplicate of segment 105G. The authoring module 415 may store the segments 422 of the digital video asset 421 in the data store 420.

In one embodiment, the authoring module 415 may identify sets of segments (as discussed above and illustrated in FIGS. 2A through 2D). Each set of segments may be associated with one or the plurality of age rating levels. For example, a first set of segments (e.g., a first version of the digital video asset 421) may be associated with the age rating level "PG," a second set of segments (e.g., a second version of the digital video asset 421) may be associated with the age rating level "R," etc. The authoring module 415 may also generate data that identifies (e.g., data that is indicative of) the set of segments. For example, the authoring module 415 may generate scripts and/or tables as illustrated in FIGS. 2A through 2D and FIG. 3. The authoring module 415 may store the scripts and/or tables in the script data 423 of the data store 420.

In one embodiment, the digital video asset 421 and the script data 423 may be provided to a manufacturer that may manufacture and/or produce a storage medium 440 (e.g., hard disks, flash drives, DVDs, BDs, etc.). For example, the manufacturer may produce DVDs and/or BDs which may be sold to consumers. In another example, the manufacturer may produce hard disks (e.g., magnetic hard disks, solid state disks, etc.) which may be sold to consumers. The manufacture may produce storage medium 440 and the storage medium 440 may include the digital video asset 421 (e.g., the segments 422) and the script data 423. The storage medium 440 may allow viewers/users to play different versions of the digital video asset 421 with different age level ratings (as discussed above). This may allow manufacturer to reduce costs when manufacturing and/or producing the storage medium 440. This may also allow a media server (illustrated in FIG. 4B) to use less storage space to store the digital video asset 421. In one embodiment, the digital video asset 421 and the script data 423 may be stored on the storage medium 440 in a certain order. For example, the table in the script data 423 (e.g., table 300 illustrated in FIG. 3) may be stored first, followed by the scripts in the script data 423 (e.g., script 200, 210, 220, and 230 illustrated in FIGS. 2A through 2D), followed by the digital video asset 421 (e.g., the segments 422). This order may allow a media player device 430 and/or media player application to play the digital video asset 421 more efficiently (e.g., may allow the digital video asset 421 to be played with less movement of a magnetic/laser read/write head).

The storage medium 440 may be provided to a media player device 430. The media player device 430 may be a computing device (e.g., a laptop computer, a desktop computer, a gaming console, a DVD player, a BD player, a smart phone, a table computer, etc.). The media player device 430 may be software, hardware, or a combination of both that allows users to play (e.g., view and/or consume) digital video assets. The media player device 430 may receive the digital video asset 421 (e.g., the storage medium 440 may be inserted into a disc drive of the media player device 430 or may be coupled to the media player device 430 via a cable, such as a universal serial bus (USB) cable).

In one embodiment, the media player device 430 may determine a first age rating level to use for playing the digital video asset 421. For example, the media player device 430 may include a setting, parameter, and/or configuration, that may be set by a user (e.g., a parent) indicating a first age rating level, such as "PG." The first age rating level may indicate that digital video assets or versions of digital video assets with an age rating level greater or higher than "PG" (e.g., "PG13," "R," "NC17," etc.) should not be played. The media player device 430 may identify a first set of segments (e.g., a first version of the digital video asset 421) based on the first age rating level. For example, referring back to FIG. 2A through 2D and FIG. 3, the media player device 430 may use table 300 (e.g., may access or analyze table 300) to identify script 210 (which identifies the first set of segments or the first version of the digital video asset 421) based on the first age rating level of "PG." The media player device 430 may play the digital video asset 421 based on the first set of segments (e.g., may play the first version of the digital video asset 421). As discussed above, if the media player device 430 is unable to identify a set of segments that is equal to or lower than the first age rating level, the media player device 430 may generate and/or display data (e.g., a message, a warning, etc.) indicating that the storage medium 440 does not include a version of the digital video asset 421 that is appropriate for the first age rating level.

In one embodiment, the media player device 430 may receive a second age rating level. For example, a user (e.g., a parent) may provide a second (e.g., temporary) age rating level. When the media application 431 receives the second age rating level, the media application 431 may identify a second set of segments (e.g., a second version of the digital video asset 421) based on the second age rating level and may play the digital video asset 421 using the second set of segments. For example, the first age rating level may be "PG" and the user (e.g., a parent) may provide user input indicating a second age rating level "R." The media player device 430 may identify a second set of segments that has an age rating level of "R" or lower (e.g., "PG13", "PG," etc.).

In one embodiment, the segments of the digital video asset 421 may be navigable to by the media player device 430. For example, referring to FIG. 1A, the segments 105A through 105R and 155A through 155E may be bookmarks, chapters, scenes, etc. that may be directly navigable to by the media player device 430. The media player device 430 may use an index, a scene selection menu, a chapter selection menu, etc., to directly select and/or play one or more of the segments 105A through 105R and 155A through 155E.

In one embodiment, a user may be able to view the segments that differ between two different versions of the digital video asset 421. For example, referring to FIG. 1A, after viewing a "PG" version of the digital video asset 150, a user may be able to request and/or view the segments of the digital video asset 150 that are in "R" version of the digital video asset 150 but are not in the "PG" version. Referring to FIG. 1B, after viewing the PG version of the digital video asset 150, the user may be able to request and/or view segments, 105G, 105J, and 105L. The user may provide user input (e.g., may provide user input to the media player device 430) to identify the two different versions of the digital video asset 150 (e.g., the "PG" version and the "R" version). A media server and/or a media player device may identify the segments of the digital video asset 150 which are in one version but are not in the other version.

In one embodiment, the media player device 430 may include older software, hardware, or combination of both and may be unable to access (e.g., unable to recognize) the scripts and/or tables (e.g., script data 423) on the storage medium 440. The storage medium 440 may include instructions and/or data that may cause the media player device 430 to play the version of the digital video asset with the lowest age rating level. For example, the digital video asset 421 includes a first version (e.g., a first set of segments) with a "PG" rating, a second version (e.g., a second set of segments) with a "PG13" rating, and a third version (e.g., a third set of segments) with an "R" rating. If the media player device is unable to access or use the scripts and/or tables, the storage medium 440 may be encoded with instructions to cause the media player device 430 to play the first version of the digital video asset with a "PG" rating.

Figure 4B:
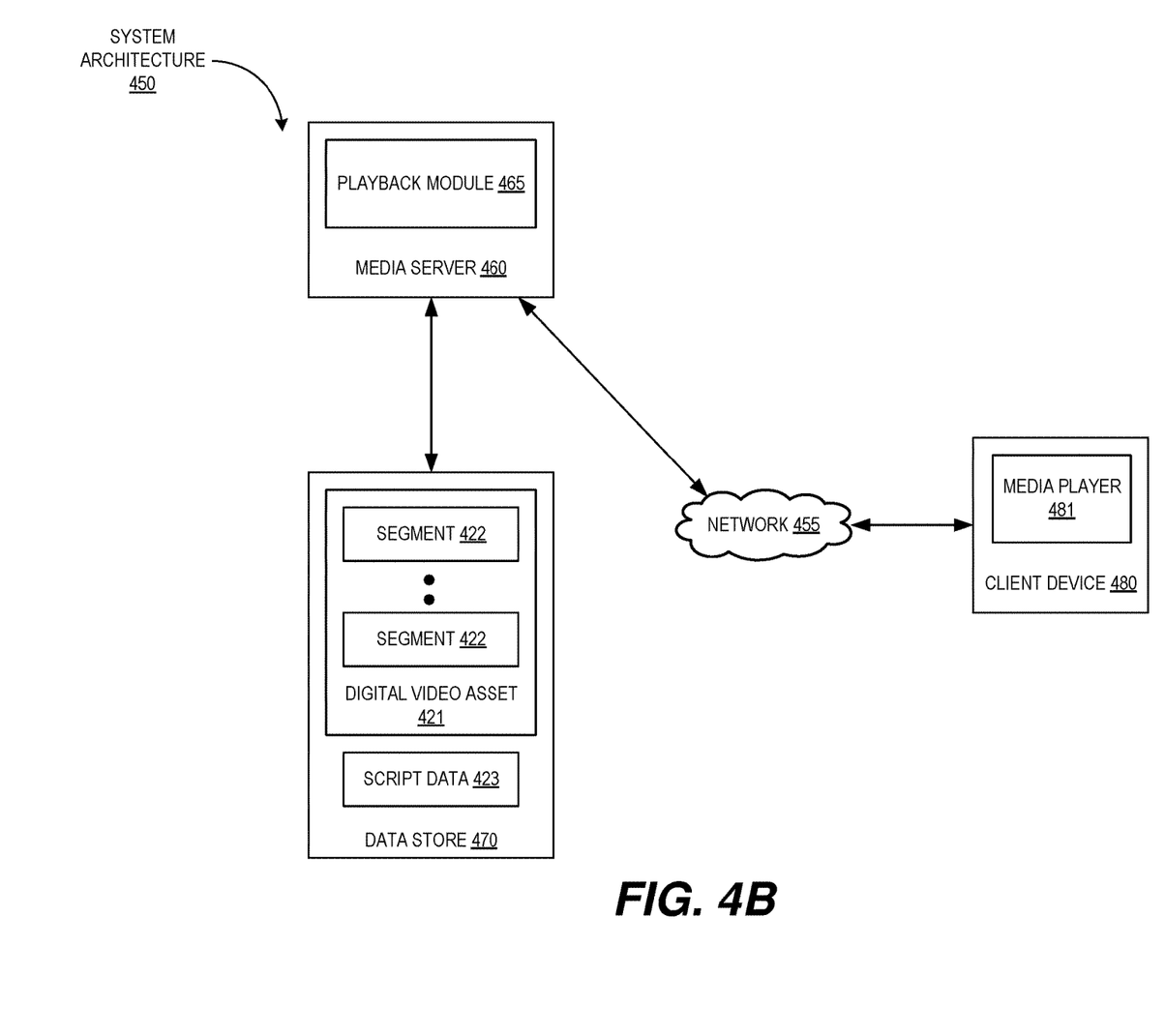
FIG. 4B is a diagram of a system architecture, according to an embodiment.

FIG. 4B is a diagram of a system architecture 450 according to one or more embodiments. The system architecture 400 includes media server 460, a data store 470, a network 455, and a client device 480. In one embodiment, network 120 may include a public network (e.g., the Internet), a private network (e.g., a local area network (LAN)), or wide area network (WAN) such as the Internet, a wired network (e.g., Ethernet network), a wireless network (e.g., an 802.11 network or a Wi-Fi network), a cellular network (e.g., a Long Term Evolution (LTE) network), routers, hubs, switches, server computers, other types of computer network, and/or a combination thereof.

Examples of the media server 460 and the client device 480 may include, but are not are not limited to, a rack-mount server, a router computer, a server computer, a personal computer, a mainframe computer, a smartphone, a personal digital assistant (PDA), a laptop computer, a tablet computer, a desktop computer, etc. The data store 470 may be may be a cache (e.g., server cache), memory (e.g., random access memory), a drive (e.g., a solid state drive, a magnetic hard drive), a flash drive, a database system, or another type of component or device capable of storing data. The data store 470 may also include multiple storage components (e.g., multiple drives or multiple databases) that may also span multiple computing devices (e.g., multiple server computers). The data store 470 may be communicatively coupled to the media server 460. The client device 480 includes a media player 481. The media player 481 may be an application, service, daemon, process, etc., that allows a user to play (e.g., view and/or consume) digital video assets.

The media server 460 includes a playback module 465. In one embodiment, the playback module 465 may receive the digital video asset 421 and the script data 423. For example, referring back to FIG. 4A, the playback module 465 may receive the digital video asset 421 and the script data 423 from the authoring module 415 and/or the computing device 410. The digital video asset 421 includes a plurality of segments 422 (as discussed above). Each of the segments 422 may include a portion of the digital video asset 421. Each of the segments 422 may be associated with one or a plurality of age level ratings. As discussed above, digital video asset 421 may not include duplicate segments. This may allow the media server 460 to store the digital video asset 421 in a memory that provides faster access (e.g., cache, RAM, etc.) instead of in a memory that provide slower access (e.g., a magnetic hard disk) because the digital video asset may use less space. The script data 423 may include scripts and/or tables that identify sets of segments (as discussed above).

In one embodiment, the playback module 465 may provide a first set of segments to the client device 480 based on the first data. For example, playback module 465 may receive a request to play the digital video asset 421 from the client device 480 (e.g., from the media player 481). The playback module 465 may determine a first age rating level associated with the client device 480, a user of the client device 480, and/or the media player 481. For example, the playback module 465 may access a setting, parameter, and/or configuration, that may be set (e.g., previously set) by a user (e.g., a parent) indicating a first age rating level, such as "G." In another example, the playback module 465 may communicate with the media player 481 to determine the first age rating (e.g., may transmit a message requesting the first age rating to the media player 481 and may receive data indicative of the first age rating level). The first age rating level may indicate that digital video assets or versions of digital video assets with an age rating level greater or higher than "PG" (e.g., "PG13," "R," "NC17," etc.) should not be played. The playback module 465 may identify a first set of segments based on the first age rating level (as discussed above). The playback module 465 may provide the first set of segments to the client device 480 and/or the media player 481. For example, the playback module 465 may transmit the first set of segments to the client device 480 via the network 455.

In one embodiment, the playback module 465 may be unable to identify a set of segments that is equal to or lower than the first age rating level. The playback module 465 may generate and/or provide data (e.g., a message, a warning, etc.) to the client device 480 and/or the media player 481 indicating that there is no version of the digital video asset 421 that is appropriate for the first age rating level.

In one embodiment, the playback module 465 may receive a second age rating level (e.g., a user may provide input indicating a second or temporary age rating level). For example, a user may provide user input indicating the second age rating level to the media player 481 and the media player 481 may transmit data indicative of the second age rating level to the playback module 465. When the playback module 465 receives the second age rating level, the playback module 465 may identify a second set of segments based on the second age rating level and may provide the second set of segments to the client device 480 and/or media player 481.

In one embodiment, the segments of the digital video asset 421 may be navigable to by the media player 481 (as discussed above). In another embodiment, a user may be able to view the segments that differ between two different versions of the digital video asset 421 (as discussed above).

In one embodiment, the playback module 465 may receive a request from the client device 480 and/or the media player 481 to play the digital video asset 421. The playback module 465 may provide at least a portion of the script data 423 to the client device 480 and/or media player 481. For example, the playback module 465 may provide a manifest file that includes the script data 423 to the media player 481. The media player 481 may determine which set of segments (e.g., which version of the digital video asset 421) to request from the playback module 465 based on an age rating level provided by a user of the client device 480. The media player 481 may request a set of segments from the media server 460 based on the age rating level and/or the script data 423.

Figure 5A:
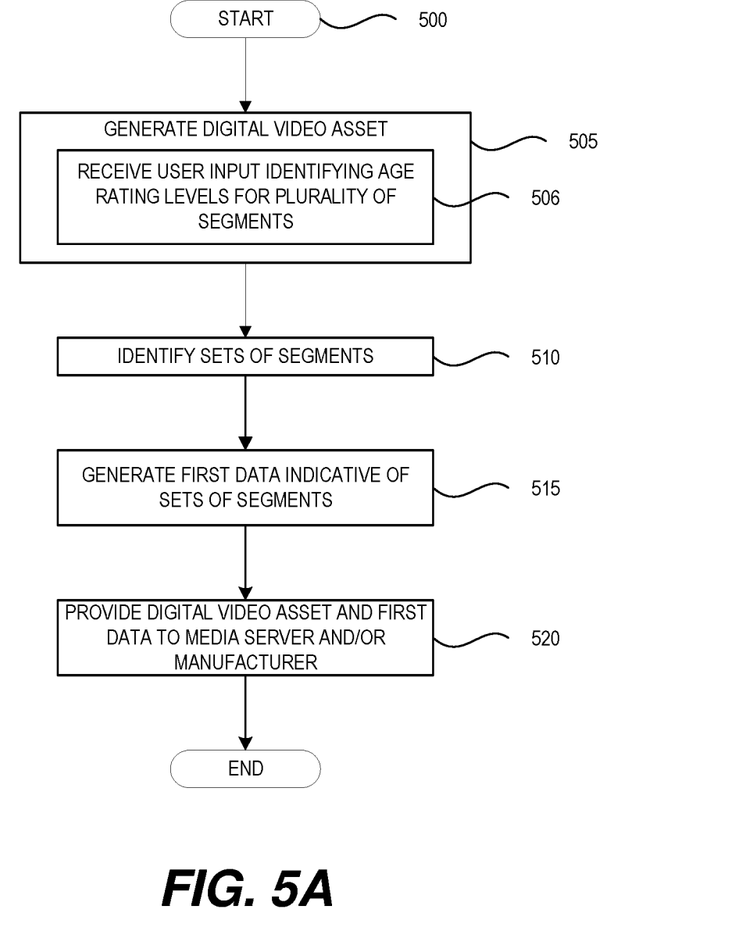
FIG. 5A is a flow diagram illustrating a process for generating a digital video asset, according to an embodiment.

FIG. 5A is a flow diagram illustrating a process 500 for generating a digital video asset, according to an embodiment. The process 500 may be performed by a computing device and/or an authoring module (e.g., computing device 410 and/or authoring module 415 illustrated in FIG. 4A). The process 500 may include generating a plurality of segments at block 505. For example, the process 500 may involve dividing the digital video asset into segments that include one or more scenes (as discussed above). The process 500 may also involve generating different versions of one or more segments (e.g., segments 155B and 155C illustrated in FIG. 1B). At block 506, the process may also include receiving user input identifying age rating levels for the plurality of segments. For example, the process 500 may receive user input from an editor, director, etc., indicating an age rating level for each segment in the plurality of segments.

At block 510, the process 500 includes identifying sets of segments. Each of the sets of segments may be associated with one of a plurality of age rating levels. For example, the process 500 may include identifying a first set of segments (e.g., a first version of the digital video asset) that has an age rating level of "PG" (as discussed above). The process 500 includes generating first data indicative of the sets of segments at block 515. For example, the process 500 may include generating scripts and/or tables (as illustrated in FIGS. 2A through 2D and FIG. 3). At block 520, the process 500 may include providing the digital video asset and the first data to a media server and/or a manufacturer.

Figure 5B:
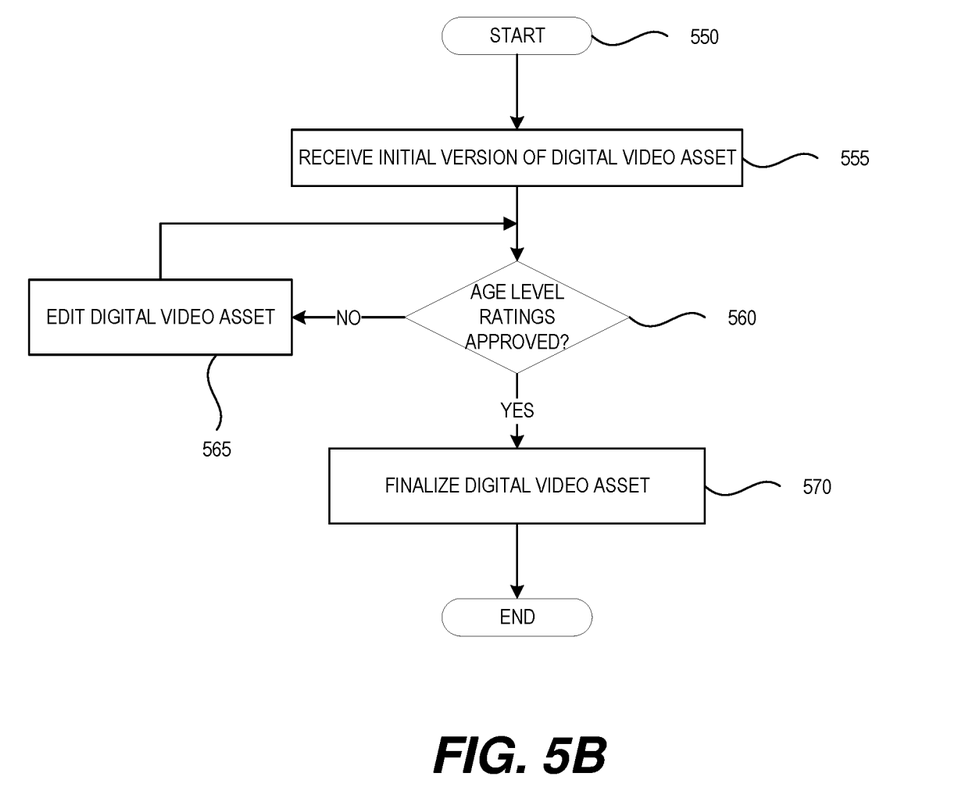
FIG. 5B is a flow diagram illustrating a process for generating a digital video asset, according to an embodiment.

FIG. 5B is a flow diagram illustrating a process 550 for generating a digital video asset, according to an embodiment. The process 550 may be performed by a producer, a computing device, and/or an authoring module (e.g., computing device 410 and/or authoring module 415 illustrated in FIG. 4A). In one embodiment, the process 550 may be performed as part of block 505 illustrated in FIG. 5A.

The process 550 may include receiving an initial version of the digital video asset. For example, the process 500 includes receiving a version of the digital video asset that was released in movie theaters (e.g., the initial version). At block 560, the process 550 includes determining whether the digital video asset has been approved for multiple desired age level ratings. For example, a producer may want to have a "PG," "PG13," and "R" version of the digital video asset. If the digital video asset is not approved for all of the desired age level ratings, the process 550 includes editing the digital video asset at block 565. For example, one or more segments may be added, modified, and/or deleted (as discussed above). The process 550 may proceed to block 560 after block 565. If the digital video asset is approved for all of the desired age rating levels, the process 550 includes finalizing digital video asset at block 570. For example, the segments that were added, modified, and/or delete at block 565 may be included and/or saved as part of the digital video asset.

Figure 6:
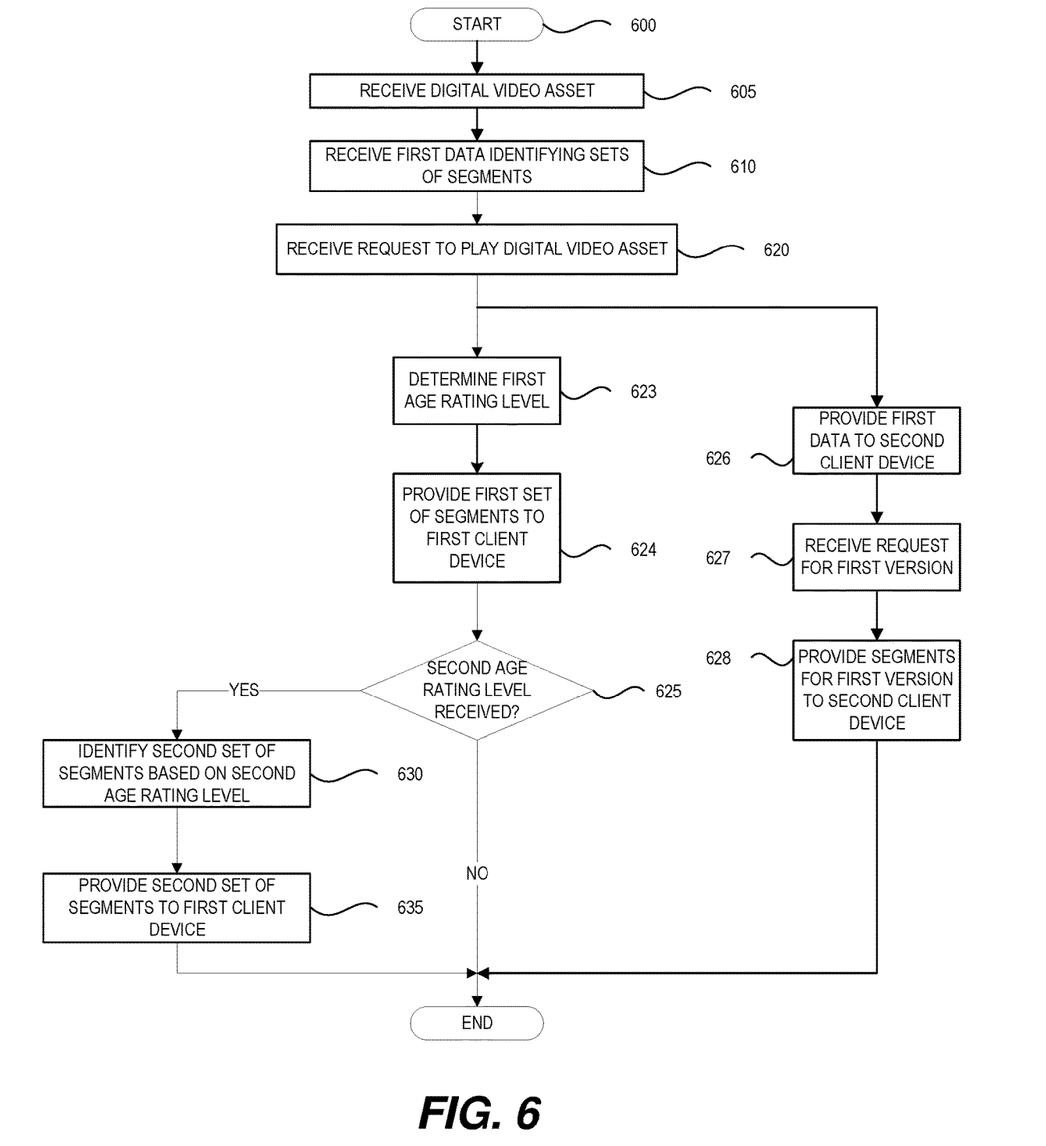
FIG. 6 is a flow diagram illustrating a process providing a digital video asset to a client device, according to an embodiment.

FIG. 6 is a flow diagram illustrating a process 600 providing a digital video asset to a client device, according to an embodiment. The process 600 may be performed by a media server and/or a playback module (e.g., media server 460 and/or playback module 465 illustrated in FIG. 4B). The process 600 may include receiving the digital video asset at block 605 and receiving first data identifying sets of segments at block 610. For example, referring to FIGS. 4A and 4B, the process 600 may receive the digital video asset 421 (which includes segments 422) and the script data 423 from computing device 410 and/or authoring module 415. The script data 423 may include scripts and/or tables (as illustrated in FIGS. 2A through 2D and FIG. 3).

At block 620, the process 600 includes receiving a request to play the digital video asset from one or more client devices. For example, a request to stream and/or download the digital video asset may be received from a first client device and a second client device. For example, a media player on a client device may transmit a request to play the digital video asset. In embodiment, the process 600 may include determining a first age rating level associated with a first client device at block 623. For example, the process 600 may include analyzing a setting, parameter, configuration, etc., that may indicate the first age rating level (as discussed above). The process 600 may include providing a first set of segments (e.g., a first version of the digital video asset) to the first client device at block 624. For example, the first set of segments may be identified based on the first age rating level and the first set of segments may be transmitted to the first client device (as discussed above). In one embodiment, the process 600 may identify the set of segments for the first client device based on the first age rating level. This may reduce the amount of data transmitted between a media server and the first client device and/or may reduce network traffic because the process 600 may determine which set of segments to provide to the client device.

In another embodiment, the process 600 may include providing at least a portion of the first data to a second client device at block 626. The second client device may analyze the first data and may determine an age rating (as discussed above in conjunction with FIG. 4B) for the second client device. The process 600 includes receiving a request for a first version of the digital video asset (e.g., receiving a request for a particular set of segments) from the second client device at block 627. For example, the second client device may request a set of segments based on the age rating and the first data (as discussed above in conjunction with FIG. 4B). At block 628, the process 600 includes providing the segments for the first version of the digital video asset to the second client device. For example, the process 600 may include streaming or downloading the digital video asset to the second client device. This may reduce the processing load of a media server (e.g., the amount of processing and/or computation performed by the media server) because the second client device may determine which set of segments (e.g., which version) of the digital video asset to request from the media server.

At block 625, the process 600 includes determining whether a second age rating level has been received. For example, a user may provide a second (e.g., temporary) age rating level to view a different version of the digital video asset (as discussed above). If the second age rating level is not received, the process 600 ends. If the second age rating level is received, the process 600 includes identifying a second set of segments based on the second age rating level at block 630 (e.g., identifying a second script). For example, a second version of the digital video asset may be identified based on the second age rating level (as discussed above). The process 600 includes providing the second set of segments to the first client device at block 635. For example, the process 600 may include transmitting the second set of segments to the first client device.

Figure 7:
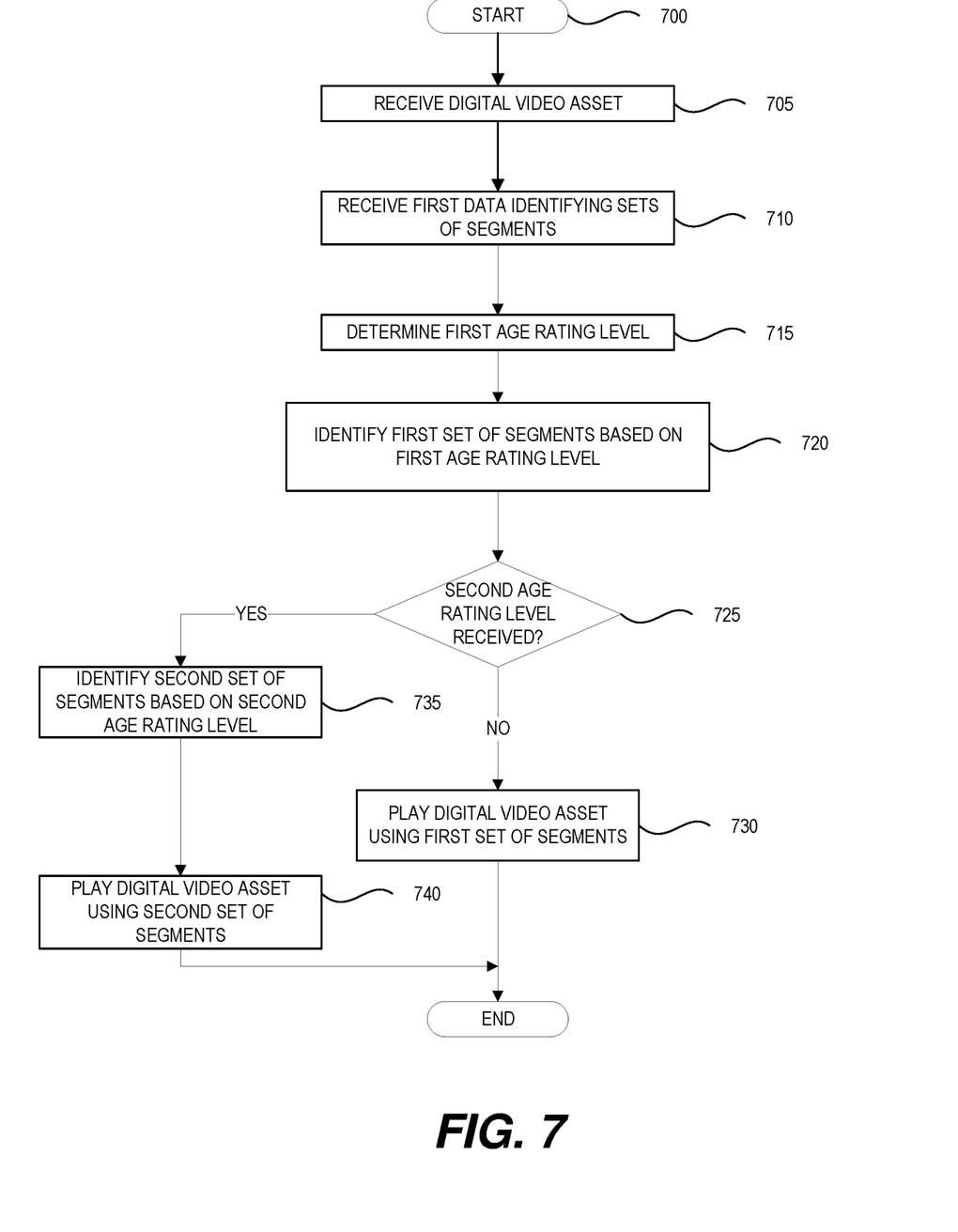
FIG. 7 is a flow diagram illustrating a process for playing a digital video asset, according to an embodiment.

FIG. 7 is a flow diagram illustrating a process 700 for playing a digital video asset, according to an embodiment. The process 700 may be performed by a media player device (e.g., media player device 430 illustrated in FIG. 4A). The process 700 may include receiving the digital video asset at block 705 and receiving first data identifying sets of segments at block 710. For example, referring to FIG. 4A, the process 700 may receive a storage medium 440 (as discussed above). The storage medium 440 may include the digital video asset and/or script data (e.g., scripts and/or tables as illustrated in FIGS. 2A through 2D and FIG. 3).

The process 700 may include determining a first age rating level at block 715. For example, the process 700 may include analyzing a setting, parameter, configuration, etc., that may indicate the first age rating level (as discussed above). At block 720, the process 700 may include identifying a first set of segments based on the first age rating level. For example, a first script (which may indicate a first set of segments) may be identified based on the first age rating level (as discussed above).

At block 725, the process 700 includes determining whether a second age rating level has been received. For example, a user may provide a second (e.g., temporary) age rating level to view a different version of the digital video asset (as discussed above). If the second age rating level is not received, the process 700 includes playing the digital video asset using the first set of segments at block 730. If the second age rating level is received, the process 700 includes identifying a second set of segments based on the second age rating level at block 735. For example, a second version of the digital video asset may be identified based on the second age rating level (as discussed above). The process 700 includes playing the digital video asset using the second set of segments at block 740.

Additional Embodiments

Those skilled in the art will appreciate that in some embodiments, other types of distributed data storage systems can be implemented while remaining within the scope of the present disclosure. In addition, the actual steps taken in the processes discussed herein may differ from those described or shown in the figures. Depending on the embodiment, certain of the steps described above may be removed, others may be added.

While certain embodiments have been described, these embodiments have been presented by way of example only, and are not intended to limit the scope of protection. Indeed, the novel methods and systems described herein may be embodied in a variety of other forms. Furthermore, various omissions, substitutions and changes in the form of the methods and systems described herein may be made. The accompanying claims and their equivalents are intended to cover such forms or modifications as would fall within the scope and spirit of the protection. For example, the various components illustrated in the figures may be implemented as software and/or firmware on a processor, ASIC/FPGA, or dedicated hardware. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc., as used herein are meant as labels to distinguish among different elements and may not necessarily have an ordinal meaning according to their numerical designation.

What is claimed is:

1. A media server for storing and transmitting digital video assets, the media server comprising:
    a data store configured to store a digital video asset, the digital video asset including a plurality of segments with individual segments having an age rating level, the data store also configured to store a plurality of scripts with a first script including a first ordered list of segments of the plurality of segments of the digital video asset wherein each segment in the first script is associated with an age rating level less than or equal to a first age rating level, and a second script including a second ordered list of segments of the plurality of segments of the digital video asset wherein each segment in the second script is associated with an age rating level less than or equal to a second age rating level, the second age rating level greater than the first age rating level; and
    a processor coupled to the data store, the processor configured to:
        receive a first request for the digital video asset from a playback device;
        retrieve a playback age rating level associated with the requesting playback device by accessing a parameter in the data store that links an age rating level with a particular playback device, the parameter set by a user indicating a desired age rating level for the user;
        in response to determining the playback age rating level is less than the second age rating level and greater than or equal to the first age rating level, transmit the segments included in the first script to the playback device;
        after transmitting the segments included in the first script, receive from the requesting playback device a second request for segments included in the second script that are not included in the first script; and
        transmit the segments included in the second script but not the first script to the playback device.

2. The media server of claim 1 wherein the processor is further configured to receive a temporary age rating level.

3. The media server of claim 2 wherein the processor is further configured to:
    in response to determining the temporary age rating level is lower than the first age rating level, transmit a message to the requesting playback device that there is no version of the digital video asset that is appropriate for the temporary age rating level;
    in response to determining the temporary age rating level is less than the second age rating level and greater than or equal to the first age rating level, transmit the segments included in the first script to the playback device; and
    in response to determining the temporary age rating level is greater than or equal to the second age rating level, transmit the segments included in the second script to the playback device.

4. The media server of claim 1 wherein the first script and the second script are included in a script table.

5. The media server of claim 4 wherein the script table includes a script for a plurality of different age rating levels greater than or equal to the first age rating level.

6. The media server of claim 1 wherein the second script includes at least one segment that replaces a segment included in the first script.

7. The media server of claim 1 wherein the second script includes at least one additional segment that is not included in the first script.

8. The media server of claim 1 wherein the first script includes a new segment that is not in the second script, the new segment associated with the first age rating level, the new segment indicative of content of one or more segments associated with the second age rating level so that the new segment explains events that occur in the one or more segments associated with the second age rating level.

9. The media server of claim 1 wherein the digital video asset lacks duplicate segments.

10. A media player device comprising:
    a data store configured to store an age rating level associated with the media player device; and
    a processor coupled to the data store, the processor configured to:

request from a media server a digital video asset having a plurality of segments with individual segments having an age rating level;

receive a manifest file from the media server, the manifest file including a first script including a first ordered list of segments of the plurality of segments of the digital video asset wherein each segment in the first script is associated with an age rating level less than or equal to a first age rating level, and a second script including a second ordered list of segments of the plurality of segments of the digital video asset wherein each segment in the second script is associated with an age rating level less than or equal to a second age rating level, the second age rating level greater than the first age rating level;

in response to determining the stored age rating level is less than the second age rating level and greater than or equal to the first age rating level, request from the media server segments included in the first script;

after presenting the received segments included in the first script, request from the media server segments included in the second script but not the first script; and present the segments included in the second script but not the first script.

11. The media player device of claim 10 wherein the processor is further configured to receive from the media server the requested segments.

12. The media player device of claim 11 wherein the processor is further configured to store the received segments in the data store.

13. The media player device of claim 11 wherein the processor is further configured to present the received segments for playback.

14. The media player device of claim 13 wherein each of the received segments comprises predetermined portions of the digital video asset that is directly navigable to by the media player device.

15. The media player device of claim 10 wherein the processor is further configured to receive a temporary age rating level.

16. The media player device of claim 15 wherein the temporary age rating level is received through a user input of the media player device.

17. The media player device of claim 15 wherein the processor is further configured to:

in response to determining the temporary age rating level is lower than the first age rating level, display a message that there is no version of the digital video asset that is appropriate for the temporary age rating level;

in response to determining the temporary age rating level is less than the second age rating level and greater than or equal to the first age rating level, request from the media server the segments included in the first script; and in response to determining the temporary age rating level is greater than or equal to the second age rating level, request from the media server the segments included in the second script.

18. The media player device of claim 17 wherein the processor is further configured to receive from the media server the requested segments.

19. The media player device of claim 10 wherein the digital video asset lacks duplicate segments.

20. A media server for storing and transmitting digital video assets, the media server comprising:

storage means for storing a digital video asset, the digital video asset including a plurality of segments with individual segments having an age rating level, and for storing a plurality of scripts with a first script including a first ordered list of segments of the plurality of segments of the digital video asset wherein each segment in the first script is associated with an age rating level less than or equal to a first age rating level, and a second script including a second ordered list of segments of the plurality of segments of the digital video asset wherein each segment in the second script is associated with an age rating level less than or equal to a second age rating level, the second age rating level greater than the first age rating level; and processor means for controlling the storage means and for:

receiving a request for the digital video asset from a playback device;

retrieving a playback age rating level associated with the requesting playback device by accessing a parameter stored in the storage means that links an age rating level with a particular playback device, the parameter set by a user indicating a desired age rating level for the user;

in response to determining the playback age rating level is less than the second age rating level and greater than or equal to the first age rating level, transmitting the segments included in the first script to the playback device;

after transmitting the segments included in the first script, receiving from the requesting playback device a request for segments included in the second script but that are not included in the first script; and transmitting the segments included in the second script but not the first script to the playback device.

* * * * *